US011062023B2

(12) United States Patent
McCallum et al.

(10) Patent No.: US 11,062,023 B2
(45) Date of Patent: Jul. 13, 2021

(54) SECURE DISTRIBUTION AND ADMINISTRATION OF DIGITAL EXAMINATIONS

(71) Applicant: ACT, INC., Iowa City, IA (US)

(72) Inventors: Ryan McCallum, Austin, TX (US); Jay Venenga, Iowa City, IA (US)

(73) Assignee: ACT, INC., Iowa City, IA (US)

( * ) Notice: Subject to any disclaimer, the term of this patent is extended or adjusted under 35 U.S.C. 154(b) by 0 days.

(21) Appl. No.: 16/413,929

(22) Filed: May 16, 2019

(65) Prior Publication Data
US 2020/0364330 A1    Nov. 19, 2020

(51) Int. Cl.
*G06F 21/53* (2013.01)
*H04L 12/24* (2006.01)
(Continued)

(52) U.S. Cl.
CPC ........... *G06F 21/53* (2013.01); *G06Q 50/205* (2013.01); *G09B 7/00* (2013.01); *H04L 41/28* (2013.01); *H04L 67/12* (2013.01)

(58) Field of Classification Search
CPC .. G06F 11/1464; G06F 11/1469; G06F 11/26; H04L 43/50; H04L 12/2856; H04L 41/0213; H04L 41/046; H04L 41/06; H04L 67/1095; H04L 67/12; H04L 69/329; H04L 63/20; H04L 63/0807; H04L 67/10; H04L 63/0272; H04L 63/105; H04L 63/1433; H04L 63/102; H04L 63/1416; H04L 63/029; H04L 63/0815; H04L 63/0884; H04L 67/02; H04L 67/42; H04L 65/60;
(Continued)

(56) References Cited

U.S. PATENT DOCUMENTS 6,779,134 B1 *  8/2004  Laviolette ........... G06F 11/3006
                                              714/38.12
9,973,489 B2 *  5/2018  Barton .................... H04L 63/20
(Continued)

OTHER PUBLICATIONS

International Search Report and Written Opinion dated Jul. 29, 2020 for International Application No. PCT/US2020/028208 filed on Apr. 15, 2020.

*Primary Examiner* — Djenane M Bayard
(74) *Attorney, Agent, or Firm* — Sheppard, Mullin, Richter & Hampton LLP

(57) ABSTRACT

A kit for administering a secure examination includes examinee interfaces and an enclosure with a gateway, power adapters to power the examinee interfaces, and a local examination server, wherein the local examination server includes a first network adapter configured to communicatively couple to a central examination server via a first network connection through the gateway and a second network adapter configured to communicatively couple to the plurality of examinee interface via a second network connection, and wherein the local examination server obtains examination items from the central examination server, transmits the examination items to the examinee interfaces, obtains a responsive input to the examination items from the examinee interfaces, transmits the responsive input to the central examination server, and causes the examinee interfaces to enter an examination mode that restricts access to applications, networks, and devices not required for taking the examination.

20 Claims, 12 Drawing Sheets

(51) Int. Cl.
*G09B 7/00* (2006.01)
*H04L 29/08* (2006.01)
*G06Q 50/20* (2012.01)

(58) Field of Classification Search
CPC . H04L 67/2823; H04L 63/10; H04L 63/0876; H04L 63/107; H04L 67/08; H04L 2209/38; H04L 41/28; H04L 63/083; H04L 63/1425; H04L 67/1097; H04L 67/141; H04L 67/20; H04L 67/26; H04L 67/28; H04L 67/306; H04L 9/0637; H04L 9/3239; H04W 12/37; H04W 12/08; H04W 12/06; H04W 12/63; H04W 12/082; H04W 12/086; H04W 12/02; H04W 12/67
See application file for complete search history.

(56) References Cited

U.S. PATENT DOCUMENTS

| | | |
|---|---|---|
| 2004/0229199 A1* | 11/2004 | Ashley ............... G09B 7/00 434/323 |
| 2008/0133964 A1 | 6/2008 | Rogers et al. |
| 2011/0045452 A1 | 2/2011 | Bejar et al. |
| 2011/0111383 A1* | 5/2011 | Srinivasan ............ G09B 7/00 434/322 |
| 2011/0223576 A1 | 9/2011 | Foster et al. |
| 2014/0302476 A1* | 10/2014 | Sorensen ............ G09B 7/00 434/307 R |
| 2016/0055327 A1* | 2/2016 | Moran ............ G06K 9/00899 726/19 |
| 2016/0307455 A1 | 10/2016 | Dorman |
| 2018/0095110 A1 | 4/2018 | Brown et al. |

* cited by examiner

SECURE DISTRIBUTION AND ADMINISTRATION OF DIGITAL EXAMINATIONS

TECHNICAL FIELD

The disclosed technology relates generally to digital testing, and more particularly various embodiments relate to systems and methods for securely distributing and administering digital examinations.

BACKGROUND

Digital testing has become prevalent, particularly for the contemporaneous administration of standardized timed examinations across multiple testing sites. Digital examinations may be distributed to test takers from a central source via a data network for administration on a examinee interface, such as a laptop computer, tablet computer, desktop computer, or other network attached device. When the digital examination is administered on a device that is outside of the direct custody or control of the test administrator (i.e., the test taker's own device), it is desirable to provide a secure testing environment to the test taker that substantially limits or restricts the test taker's ability to access information, data, or resources that are external to the test taking environment, whether those information, data, or resources are hosted on a network accessible data store or on the test taker's own device.

Using traditional digital testing and distribution technology, an examination administrator is generally required to check device readiness and set specific security protocols on an individual device level. The examinee interface is then generally booted into a secure kiosk mode that runs outside of the normal operating environment of the operating system, i.e., the system is required to boot into the kiosk mode from the system bios. This process is time consuming, not dependable, nor verifiable to a test publisher or service organization. Even in circumstances where security verification is done automatically, the verification check is generally run only prior to booting into the kiosk mode, leaving open the possibility that a security breach occurs after the examination starts. For example, a test taker could attach an external device or otherwise "hack" the system after the examination is initiated on the examinee interface.

Even if the test taker is not attempting to breach security protocols, existing testing technology where system security verifications are only run prior to initiating the examination leave open the possibility that the examinee interface configuration could change during the examination at no fault of the test taker, e.g., through power or battery drains, viruses, bugs, or unintentional acts. Moreover, existing technology generally depends on an uplink to a central examination-server to administer testing, and is susceptible to interruptions in WAN connectivity.

BRIEF SUMMARY OF EMBODIMENTS

Systems and methods for secure distribution and administration of digital examinations are provided. In some embodiments a local testing server, in addition to a central examination-based server, are implemented to manage device readiness and security measures automatically to implement a seamless, rapid deployment of a secure examination environment to a number of examinee interfaces.

Embodiments of the disclosure provide a system for administering a secure examination includes a local examination server, multiple examinee interfaces, and a gateway. For example, the examinee interfaces could be laptop computers, desktop computers, tablet computers, handheld computers, or smart phones. The local examination server may include a network adapter, a security system, a processor, and a non-transitory memory with computer executable instructions embedded thereon. The network adapter may provide a first network connection to a central examination server through the gateway and a second network connection to the plurality of examinee interfaces.

In some examples, the computer executable instructions may cause the processor to obtain a plurality of examination item from the central examination server, transmit the examination items to the plurality of examinee interfaces, obtain, from the examinee interfaces, answers corresponding to the examination items, and transmit, to the central examination server, the answers after all examinations have been completed.

In some examples, the security system is configured to perform a first scan of the plurality of examinee interfaces to record properties of each of the plurality of examinee interfaces and verify that the examinee interface conform to a predetermined configuration. For example, the predetermined configuration may include a minimum operating system version and patch level, a minimum bios level, the presence of up-to-date anti-virus software, a minimum battery level, the presence of intrusive software, open communication channels, external devices, non-compatible hardware or software, screen capture software, or other potential security and/or operational threats. In some embodiments, the security system may perform a second scan of the plurality of examinee interfaces and the first and second network connections to verify the first and second network connections and the plurality of examinee interfaces continue to conform to the predetermined configuration, i.e., prior to the entry of a secure examination mode. The security system may then cause the examinee interfaces to enter an examination mode. While in examination mode, the examinee interfaces have limited access to external hardware and third part software.

For example, examination mode may limit or disable access to applications such as the clipboard, web browser, digital assistants, notepad, chat messenger, email, or other applications from which the test taker could access potential information to assist with the taking of the examination. Examination mode may also limit access to external hardware such as network adapters, wireless adapters, cameras, speakers, microphones, or other devices from which the test taker could potentially access information. For some operating systems, the examination mode may be a "kiosk" mode. As disclosed herein, many operating systems have registry flags or settings that may cause the operating system to enter an examination or kiosk mode. Embodiments disclosed herein implement operating system and/or registry flags to induce an examination mode, as opposed to requiring the system to restart into kiosk mode.

In some embodiments, the obtained examination item may be displayed to the plurality of examinee interfaces within secure examination windows. The security system may further cause the examinee interfaces to disable access to restricted applications and system functions.

In some examples, the security system may monitor the first and second network connections and plurality of examinee interfaces while the examinee interfaces that are in examination mode to verify conformance with the predetermined configuration during the administration of the examination. After completion of the examination, the local examination server may cause the examinee interfaces to exit examination mode after completion of the examination.

In some embodiments, the first network connection is a wide-area network (WAN) network connection. Alternatively, the first network connection may be a wireless or cellular connection, a BLUETOOTH connection, a WiFi connection, or other network connection. The first network connection may be implemented through a gateway or router device. In some examples, the second network connection is a WiFi connection or a local area network (LAN) connection. The second network connection may alternatively be a BLUETOOTH connection or other local network connection. The first and second network connections may be implemented through the same or different network adapters. In some examples, the first and second network connections are concurrently active during the examination. The concurrent connectivity may be synchronous or asynchronous. In some embodiments, examination data is stored on the local examination server such that examination items may be distributed to examinee interfaces via the second network connection even when the first network connection is not active.

In some embodiments, a digital examination distribution kit is provided that includes multiple examinee interfaces stored and shipped in an enclosure, wherein the enclosure may include the local examination server and network adapters. The enclosure may also include charging interfaces for the examinee interfaces. The examinee interfaces may be removed from the enclosure to activate them and initiate network connections to them. In other embodiments, the examinee interfaces may be provided by the test takers. In some embodiments, some examinee interfaces may be provided by the test takers, whereas other examinee interfaces may be from the digital examination distribution kit.

In some examples of the disclosed technology, the first and second scans are security and readiness checks ensuring the properties of the plurality of examinee interfaces are suitable for examination, the network connection for each examinee interface is secure, and that no examinee interface is running restricted applications.

The present disclosure also provides methods for securely distributing digital examinations using the disclosed system and/or kit. The method may include establishing a first network connection between the local examination server and a central examination server via the gateway, establishing a second network connection between the local examination server and the plurality of examinee interfaces, obtaining examination items from the central examination server, transmitting the examination items to the plurality of examinee interfaces, and obtaining, answers responsive to the examination items from the plurality of examinee interfaces. The method may also include transmitting the answers to the central examination server.

In some examples, the method includes causing a security system to perform initial scans of the plurality of examinee interfaces to record properties of each of the plurality of examinee interfaces and verify conformance with a predetermined configuration.

The method may include causing the examinee interfaces to enter an examination mode after performing the initial scans. The method may include causing the examination items to be displayed on the examinee interfaces within secure examination windows when the examinee interfaces are in examination mode. The examination mode may disable access to any other restricted applications during examination.

In some embodiments, the method includes monitoring the examinee interfaces and the first and second network connections during the examination to verify conformance with the predetermined configuration. The method may include causing the examinee interfaces to exit examination mode when the examination is complete.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the disclosed technology can be practiced with modification and alteration, and that the disclosed technology be limited only by the claims and the equivalents thereof.

DETAILED DESCRIPTION OF THE EMBODIMENTS

Figure 1A:
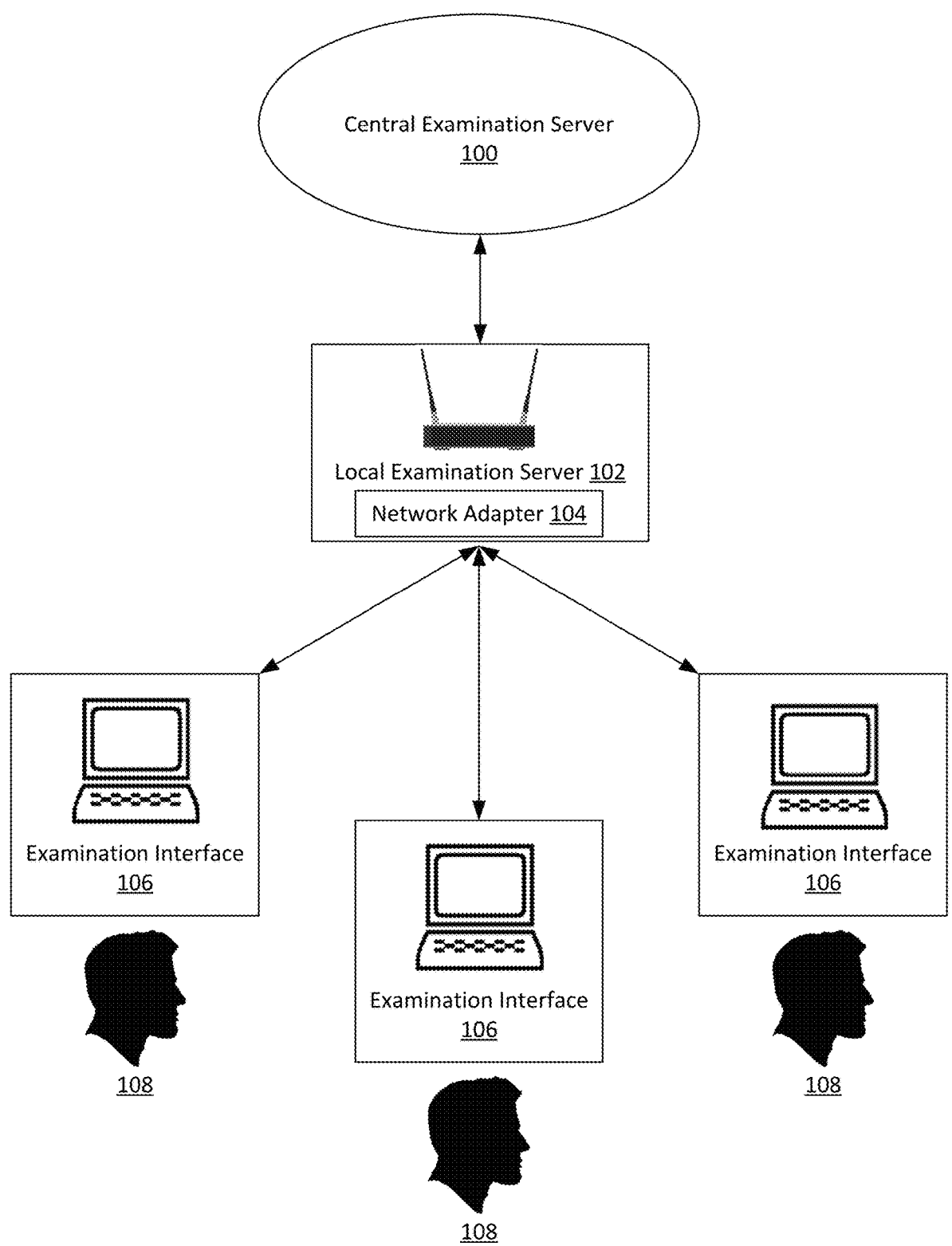
FIG. 1A illustrates an example system for secure distribution and administration of digital examinations, consistent with embodiments disclosed herein.

Embodiments of the technology disclosed herein are directed toward a system and method for secure distribution and administration of digital examinations FIG. 1A illustrates an example system for secure distribution and administration of digital examinations, in accordance with one or more implementations of the disclosure. In some embodiments, an example system for secure distribution and administration of digital examinations may comprise of a central examination server 100, a local examination server 102, a network adapter 104, one or more examinee interfaces 106, and one or more test takers 108. The central examination server 100 may communicate with the local examination server 102 through a wireless communication protocol. In some embodiments a wireless communication protocol may be WLAN, 3G, 4G, 5G, or LTE.

In some embodiments, the local examination server 102 may comprise a network Adapter 104 that allows for wireless communication between the local examination server 102 and the central examination server 100. In some embodiments, the Network Adapter 104 may be configured to separate the network communication between the one or more examinee interfaces 106 and the central examination server 100, while still allowing communication with the local examination server 102.

In some embodiments, the one or more examinee interfaces 106 may be one or more personal computing devices of the Examinee Interface Users 108. In some embodiments, a personal device may be desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment, as described herein. In some embodiments the one or more examinee interfaces 106 may be a part of an examination kit designed with the purpose to interact with the system for the secure distribution and administration of one or more digital examinations, as disclosed herein.

Figure 1B:
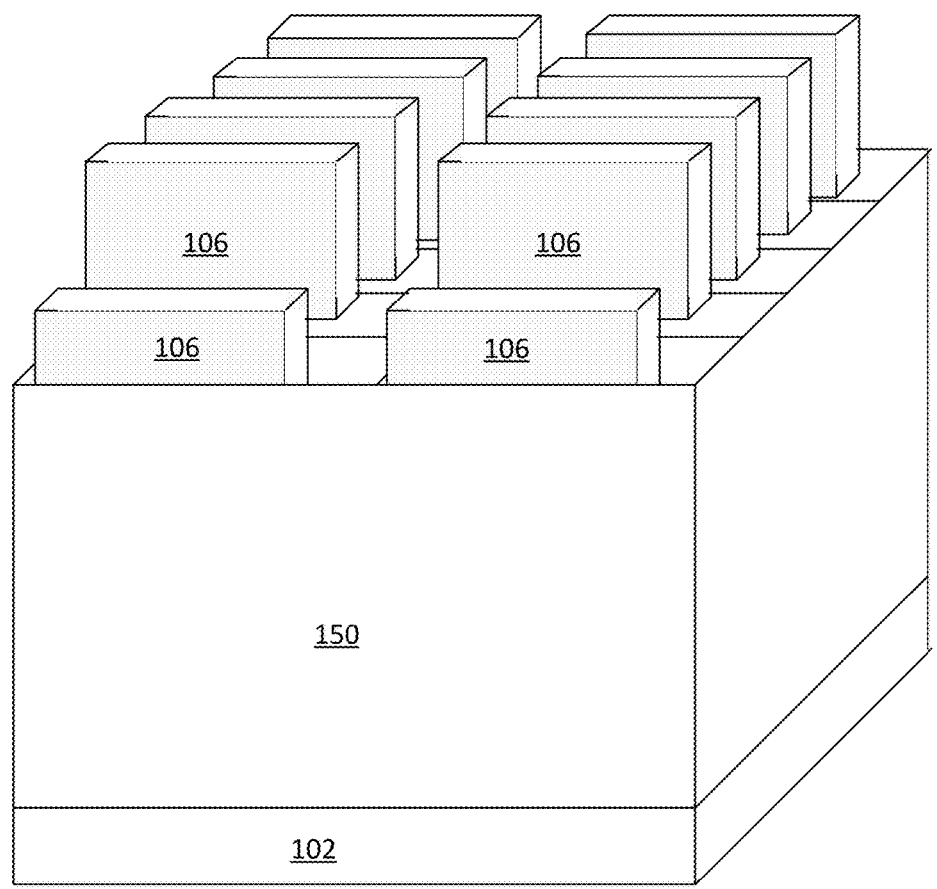
FIG. 1B illustrates an example examination kit, consistent with the embodiments disclosed herein.

FIG. 1B illustrates an example examination kit in accordance with one or more implementations of the disclosure. In implementations, the examination kit may comprise of an examination local server as described in FIG. 1A, a digital examination distribution kit 150, and one or more examinee interfaces 106. The examination kit may be configured to administer a secure examination by providing a built-in local examination server 102 and one or more associated network gateways. In some embodiments, the local examination server 102 may be pre-configured to connect with the provided examinee interfaces 106 included in the kit. For example, kit 150 may include an enclosure for storing and shipping examinee interfaces 106. In some examples, the enclosure may include charging interfaces to charge the examinee interfaces 106 when they are disposed in the kit enclosure.

In some embodiments, the examinee interfaces 106 may automatically retrieve examination data from the local examination server 102 upon initialization of the examinee interface and/or upon removal of the examinee interface from the kit enclosure. In some embodiments, the examinee interfaces 106 may be pre-configured for security. For example, one or more of the examiner interfaces may be pre-programmed to be in a Kiosk mode, wherein an examiner interface in kiosk mode may be denied access to the one or more network services. Network services may include the global internet network, central examination server, and mobile connectivity.

Figure 1C:
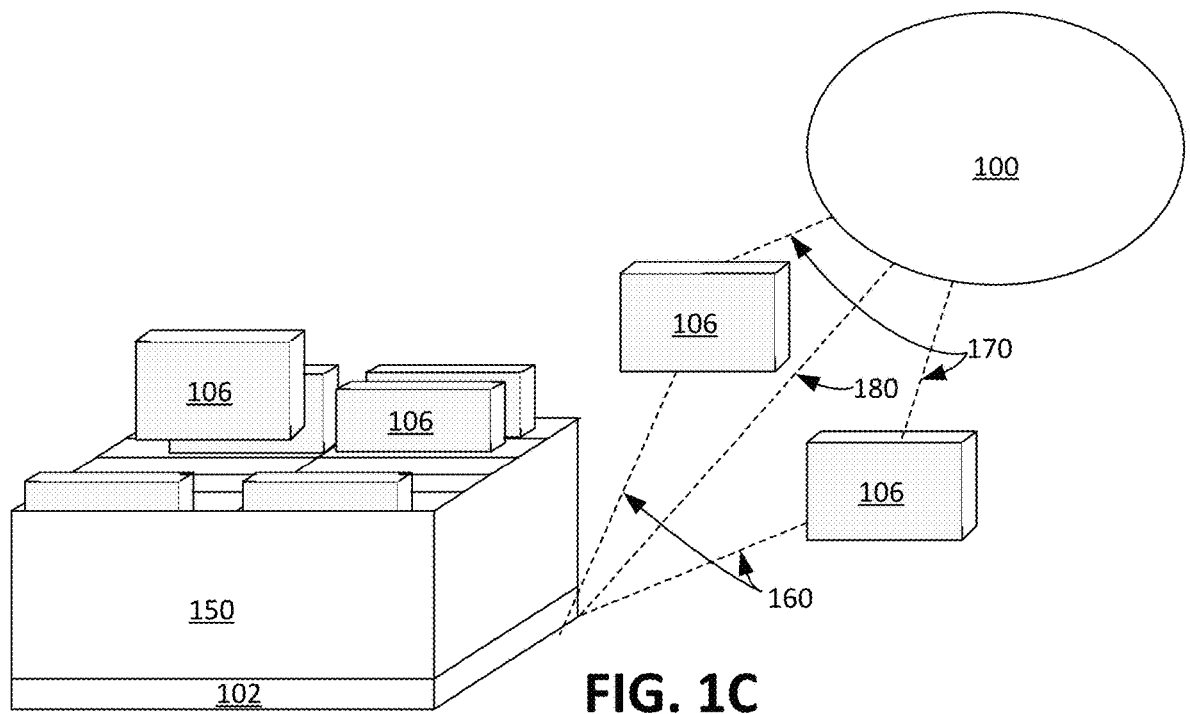
FIG. 1C illustrates an example examination kit interacting in an example system for secure distribution and administration of digital examinations, consistent with embodiments disclosed herein.

FIG. 1C illustrates an example examination kit interacting in an example system for secure distribution and administration of digital examinations, in accordance with one or more implementations of the disclosure. In some embodiments, the local examination server 102 may be connected to the examinee interfaces through wireless communication protocol such as TCP/IP, Bluetooth BLE or a cellular network such as 3G, 4G, 5G, or LTE 160.

In some embodiments the central examination server may be connected to the examinee interfaces through wireless communication protocol such as TCP/IP, Bluetooth BLE or a cellular network such as 3G, 4G, 5G, or LTE 170.

Additionally, some embodiments may configure the central examination server to be connected with the local examination server 102 through wireless communication protocol such as TCP/IP, Bluetooth BLE or a cellular network such as 3G, 4G, 5G, or LTE 180.

Figure 2:
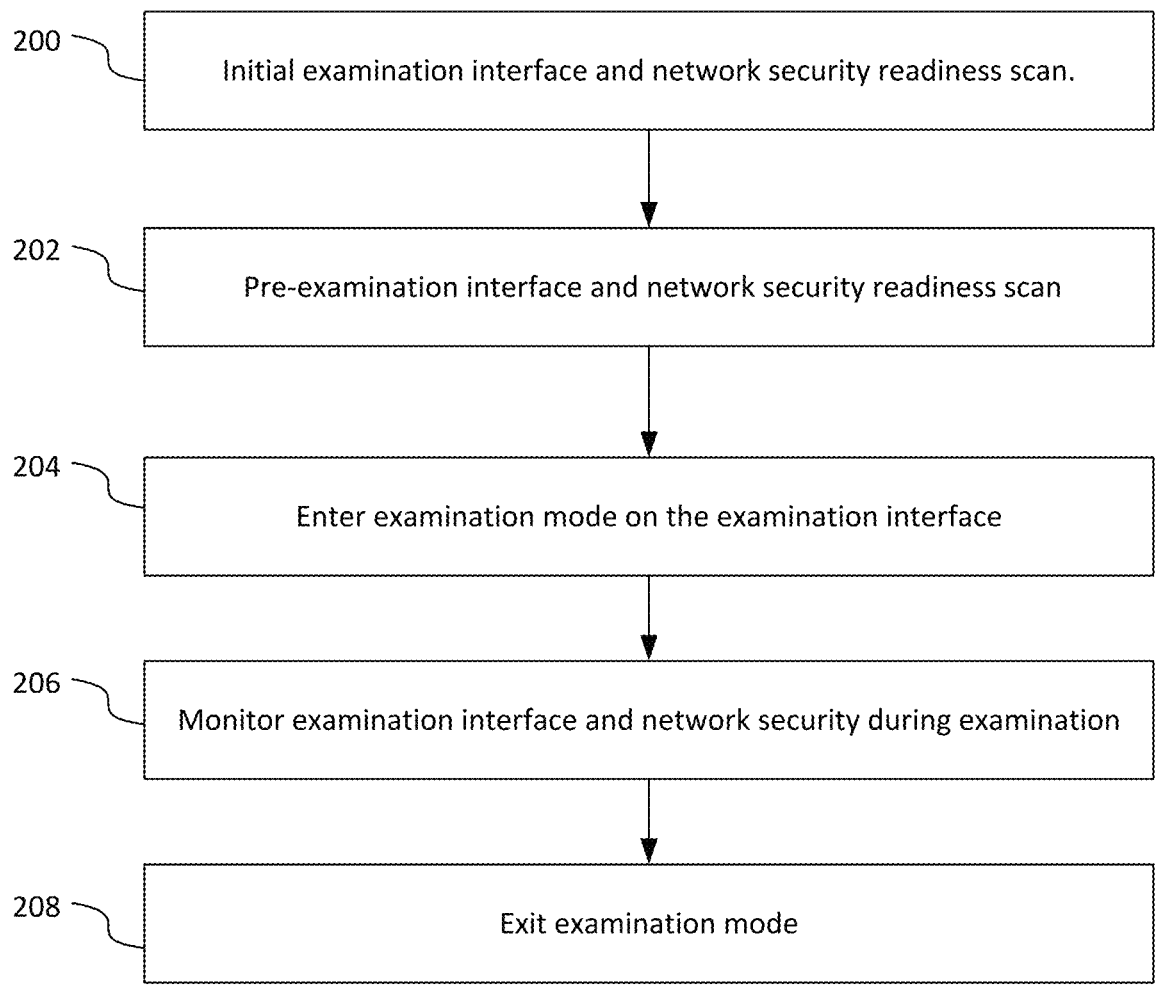
FIG. 2 is a flow chart illustrating an example method describing the complete process for secure distribution and administration of digital examinations, consistent with embodiments disclosed herein.

FIG. 2 is a flow chart illustrating an example method describing the process for the secure distribution and administration of digital examinations, in accordance with one or more implementations of the disclosure.

As illustrated in FIG. 2, an initial examinee interface and network security readiness scan may be performed at step 200. In some embodiments, an initial examinee interface and network security readiness scan may include verifying whether the examinee interface is compatible with the rules in the system for secure distribution and administration of digital examinations. For example, certain systems for secure distribution and administration of digital examinations may only allow interaction with a specific subset of operating systems. In some embodiments the examinee interface will and network security readiness scan may be performed.

In some embodiments, an additional examinee interface and network security readiness scan may be performed at step 202 prior to entering the examination mode and/or prior to the distribution of the digital examination to the examinee interfaces. In some embodiments, the additional examinee interface and network security readiness scan may include verifying that nothing on the examinee interface has been modified since the initial scan.

The disclosed process may include causing the examinee interfaces to enter an examination mode at step 204. In some embodiments the examination mode may be a kiosk mode, or similar mode for the respective operating system of the examinee interface. In some embodiments an examinee interface in kiosk mode may have restricted or disabled access to applications, services, and network services that are not required for taking the digital examination.

The disclosed process may also include monitoring the examinee interfaces and performing network security checks during the examination at step 206. In some embodiments, monitoring of the examinee interface during examination may include scanning an examinee interface on a specific time interval. In some embodiments, monitoring of the examinee interface during examination may include scanning an examinee interface on an event driven basis. For example, a scan could occur on a per question basis or by a Proctor noticing specific behavior by an examinee interface user or examinee interface.

The process may include causing the examinee interfaces to exit examination mode, i.e., return to normal operating conditions when the examination is complete or terminated. In some embodiments, causing the examinee interface to return to normal operating conditions may include enabling access to the one or more applications, services, or network services that had been restricted or disabled during the examination mode.

Figure 3:
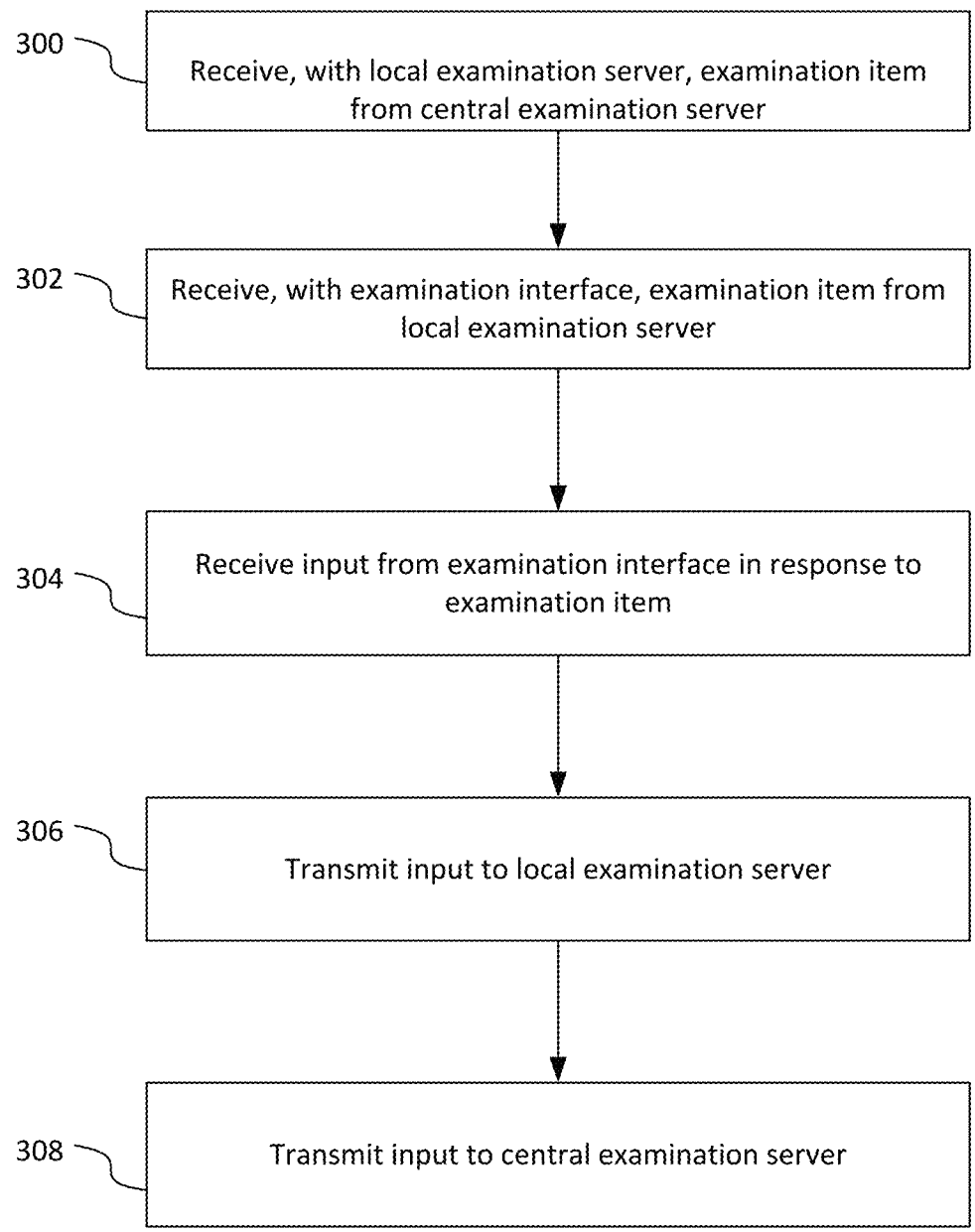
FIG. 3 is a flow chart illustrating an example method describing the process of securely delivering, displaying and receiving a question and answer in an example system for secure distribution and administration of digital examinations, consistent with embodiments disclosed herein.

FIG. 3 is a flow chart illustrating an example method describing the process of securely delivering, displaying, and receiving a question and answer for the secure distribution and administration of digital examinations, in accordance with one or more implementations of the disclosure.

As illustrated in FIG. 3, the local examination server may obtain examination items from the central examination server at step 300. Examination items may include questions and/or content contained in the digital examination. In some embodiments, the central examination server may transmit the examination items through wireless protocol such as TCP/IP, Bluetooth BLE or a cellular network such as 3G, 4G, 5G, or LTE.

The method may include transmitting the examination items to the examinee interfaces at step 302. In some embodiments the local examination server may transmit the examination items through a wireless protocol such as TCP/IP, Bluetooth BLE, or a cellular network such as 3G, 4G, 5G, or LTE. The examinee interface may obtain responsive input, i.e., responses or answers to the examination items, from a test taker through a secure interface window at step 304 and transmit the responses or answers to the local examination server at step 306. In some embodiments, the examinee interface may transmit the responses or answers through a wireless protocol such as TCP/IP, Bluetooth BLE or a cellular network such as 3G, 4G, 5G, or LTE.

The local examination server may transmit the responses or answers to the central examination server, together with demographic input respective to each test taker, at step 308. In some embodiments, the answers or responses may be transmitted through a wireless protocol such as TCP/IP, Bluetooth BLE or a cellular network such as 3G, 4G, 5G, or LTE.

Figure 4:
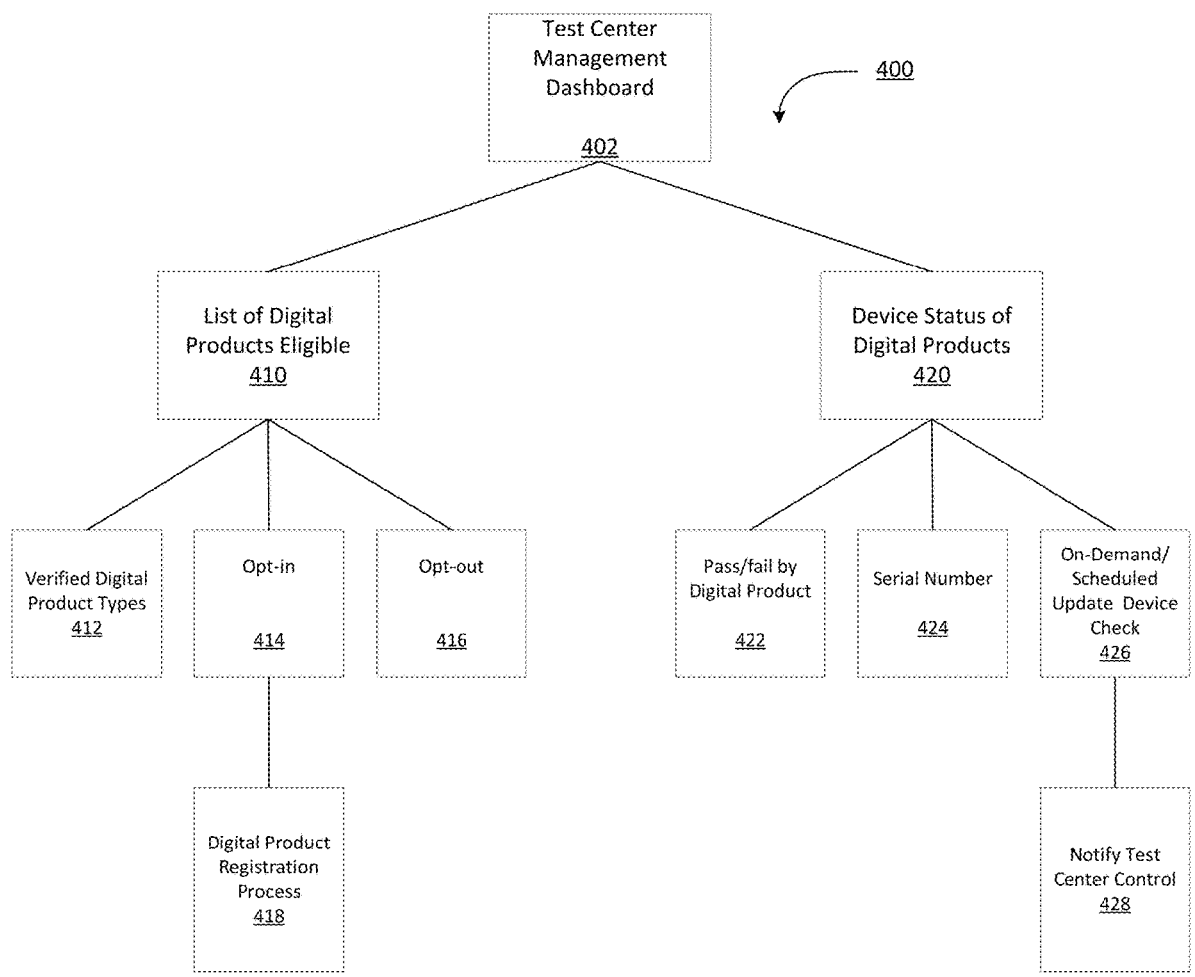
FIG. 4 is a components diagram illustrating an example configuration of the Test Center Management Systems in an example system for secure distribution and administration of digital examinations, consistent with embodiments disclosed herein.

FIG. 4 is a components diagram illustrating an example configuration of the test center registration and device verification system for authorizing a device in a system for secure distribution and administration of digital examinations, consistent with embodiments disclosed herein. In some embodiments, the test center management (TCM) dashboard 402 may be the top hierarchical logical circuit of the test center Registration and device verification system 400. In some embodiments, the test center management dashboard 402 may communicate the list of digital products eligible 410 to initially verify whether a new device can be integrated into the secure distribution and administration of digital examinations. In some embodiments, the test center management dashboard 402 may communicate with the device status of digital products logical circuit 420. In some embodiments, device status of digital products logical circuit 420 may be used to monitor devices on in a system for secure distribution and administration of digital examinations after the device has been initially verified, and throughout the examination process.

In some embodiments, the test center management dashboard 402 verifies if a specific digital product trying to checking if it is in the list of digital products eligible 410. In some embodiments, if a device is on the list of digital products eligible they are presented with an opt-in logical circuit 414 and an opt-out logical circuit 416. The opt-in logical circuit may include terms and conditions surrounding the use of the digital examinee interface. In some embodiments the Opt-in logical circuit may include terms and conditions surround the use of the entire system for secure distribution and administration of digital examinations.

In some embodiments, if a device is not on the list of digital products eligible a verified digital product types logical circuit 412, determines if the device trying to register is compliant with the rules established in the system for secure distribution and administration of digital examinations. In some embodiments, a digital product that gets approved by the verified digital product types logical circuit 412 may be added to the list of digital products eligible 410. A digital product that is not added to the list may be disapproved and, thus, is not added to the list of digital products eligible 410.

In some embodiments, the device status of digital products logical circuit 420 may invoke the pass/fail digital product logical circuit 422, which may determine status based on updates to the digital products it is enabled to interact with. In some embodiments, the device status of digital products logical circuit 420 may invoke the serial number logical circuit 424, which may cause a status change depending on the activity of that specific devices serial number. For example, if a specific device associated with a serial number was consistently malfunctioning or over performing, the device status could be modified. In some embodiments, the device status of digital products logical circuit 420 may invoke the on-demand/scheduled update device check logical circuit 426.

In some embodiments, the on-demand/scheduled update device check logical circuit 426 may not be invoked during an examination phase. In some embodiments, embodiments, the on-demand/scheduled update device check logical circuit 426 may be invoked on a specific time interval. In some embodiments, embodiments, the on-demand/scheduled update device check logical circuit 426 may be invoked, on an event driven basis. For example, the on-demand/scheduled update device check logical circuit 426 may be invoked on a per question basis or by a Proctor noticing specific behavior by an examinee interface user or examinee interface. In some embodiments, embodiments, the on-demand/scheduled update device check logical circuit 426 may be invoked by the examinee interface itself. For example, the device check logical circuit 426 may be invoked from an examinee interface with a low battery. In some embodiments, the on-demand/scheduled update device check logical circuit 426 may be invoke the notify test center control logical circuit 428.

Figure 5A:
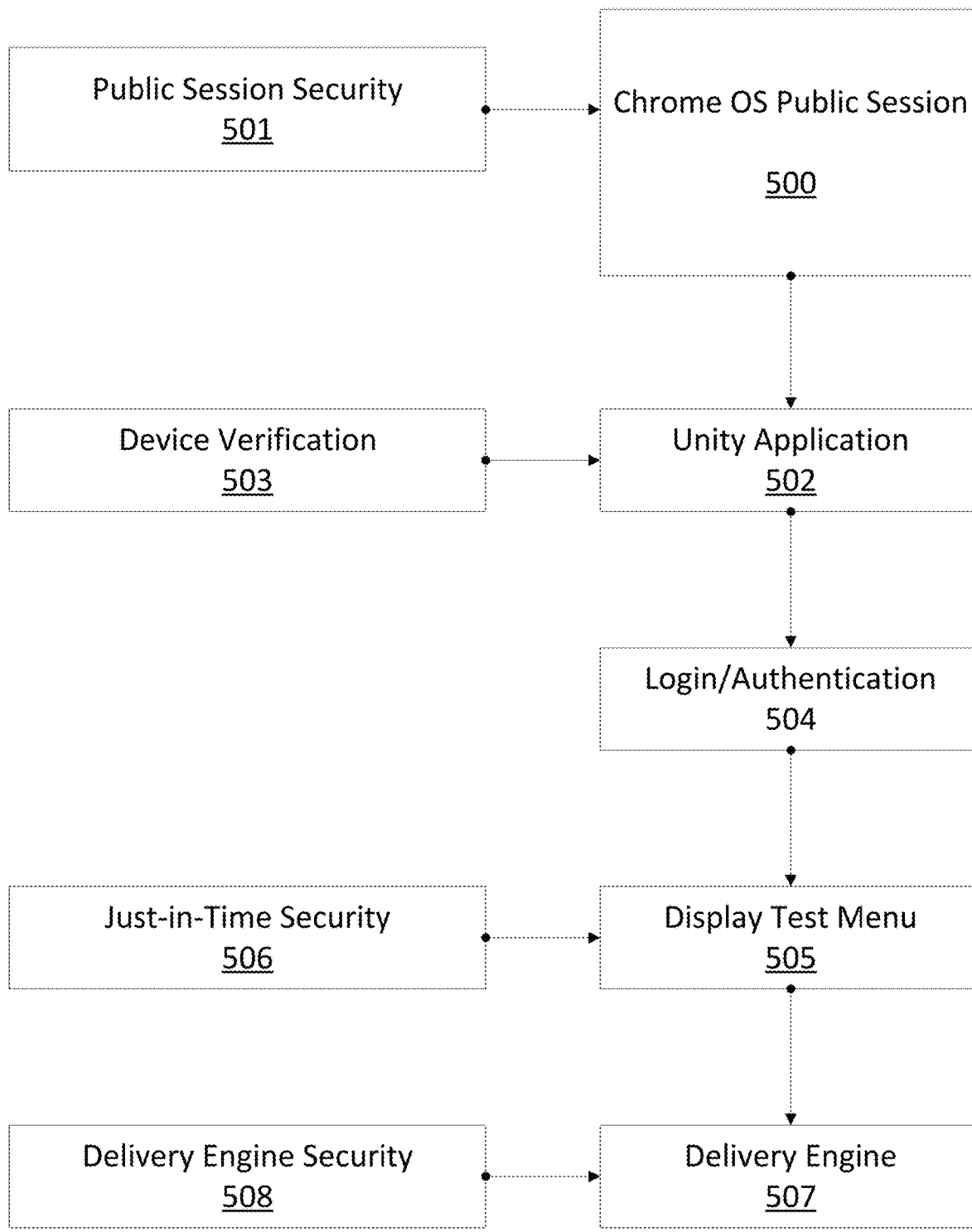
FIG. 5A is a components diagram illustrating an example configuration of the secure distribution and administration of digital examinations system interacting with a Chrome Operating System (OS) Public Session, consistent with embodiments disclosed herein.

FIG. 5A is a components diagram illustrating an example configuration of the secure distribution and administration of digital examinations system interacting with a Chrome Operating System (OS) public session, consistent with embodiments disclosed herein. In one embodiment, the public session security logical circuit 501 may initially secure Chrome OS Public Session 500. Chrome OS public session logical circuit 500 may communicate with the unity application 502. The device verification logical circuit 503 verifies that the device is compliant with the secure distribution and administration of digital examinations system rules and allows invocation of the unity application 502. The unity application 502 may communicate with the login/authentication logical circuit, which authenticates individual users in the secure distribution and administration of digital examinations system. In some embodiments, the Login/Authentication logical circuit 504 may invoke the display test menu 505. In some embodiments the just-in-time check 506 secures and invokes the display test menu 505, by verifying that the device is still compliant with the rules of the secure distribution and administration of digital examinations system. In some embodiments, the display test menu 505 communicates with the delivery engine logical circuit 507, which may use the delivery engine Security logical circuit 508, to verify that delivery of information happens in a manner that is compliant with the rules of the secure distribution and administration of digital examinations system.

Figure 5B:
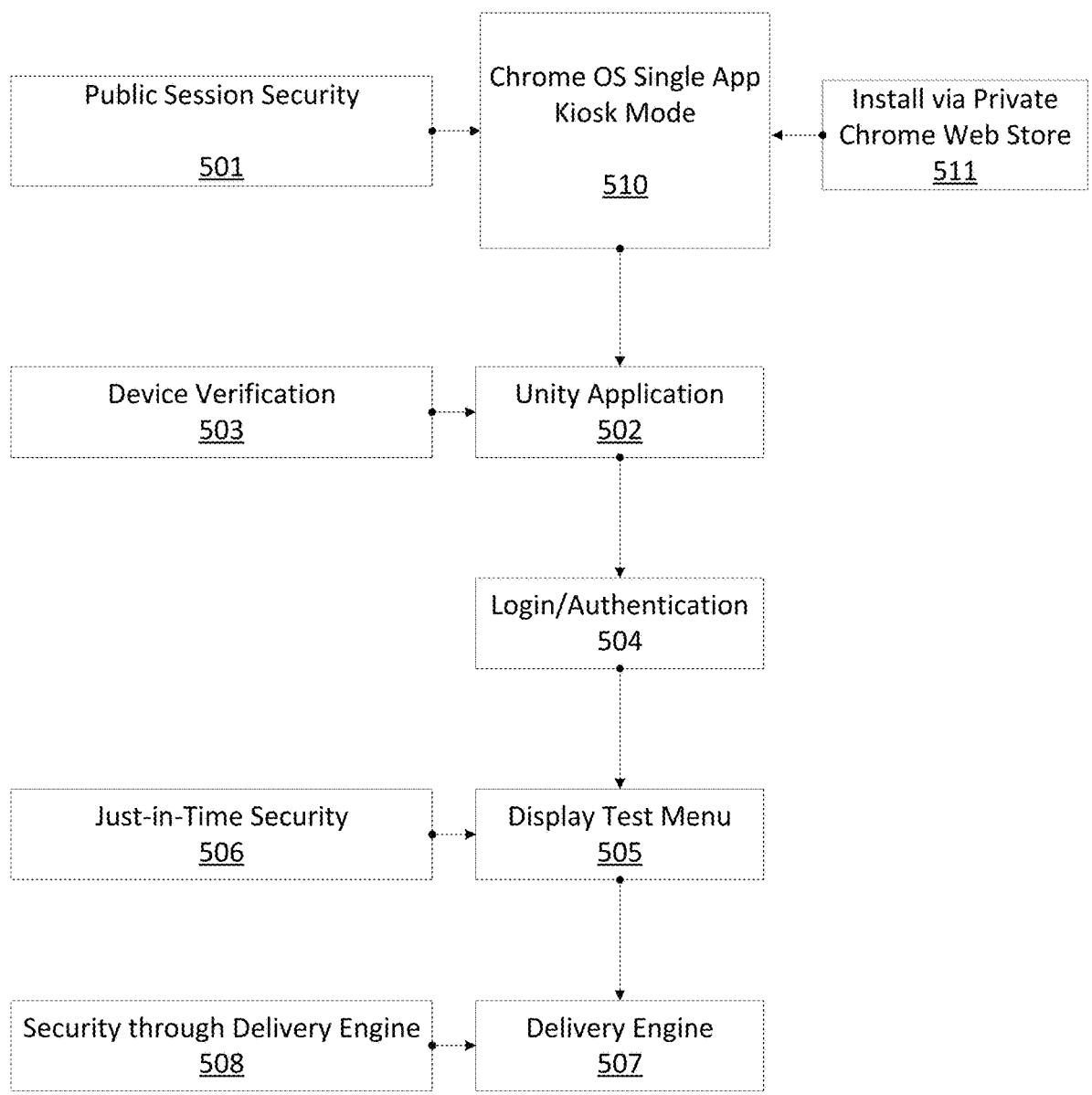
FIG. 5B is a components diagram illustrating an example configuration of the secure distribution and administration of digital examinations system interacting with Chrome (OS) Single App Kiosk Mode, consistent with embodiments disclosed herein.

FIG. 5B is a components diagram illustrating an example configuration of the secure distribution and administration of digital examinations system interacting with Chrome (OS) single app kiosk mode, consistent with embodiments disclosed herein. public session security 501, along with an install via private Chrome web store logical circuit 511 initially secure Chrome (OS) single app kiosk mode 500. Chrome (OS) single app kiosk mode 510 communicates with the unity application 502. The device verification logical circuit 503 verifies that the device is compliant with the secure distribution and administration of digital examinations system rules and allows invocation of the unity application 502. The unity application 502 may communicate with the login/authentication logical circuit, which authenticates individual users in the secure distribution and administration of digital examinations system. In some embodiments, the Login/Authentication logical circuit 504 may invoke the display test menu 505. In some embodiments the just-in-time check 506 secures and invokes the display test menu 505, by verifying that the device is still compliant with the rules of the secure distribution and administration of digital examinations system. In some embodiments, the display test menu 505 communicates with the delivery engine logical circuit 507, which may use the delivery engine security logical circuit 508, to verify that delivery of information happens in a manner that is compliant with the rules of the secure distribution and administration of digital examinations system.

Figure 5C:
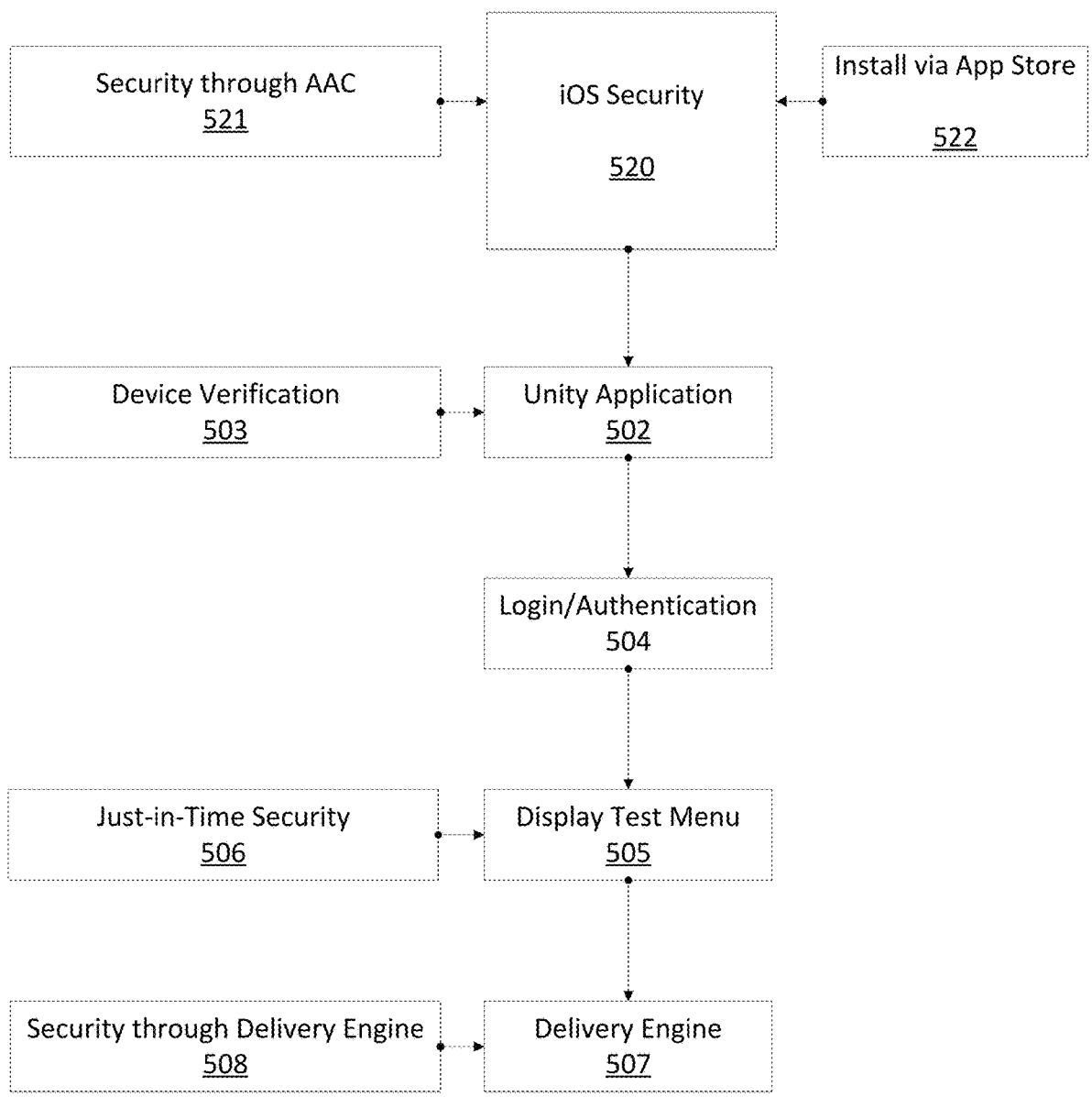
FIG. 5C is a components diagram illustrating an example configuration of the secure distribution and administration of digital examinations system interacting with iOS Security, consistent with embodiments disclosed herein.

FIG. 5C is a components diagram illustrating an example configuration of the secure distribution and administration of digital examinations system interacting with iOS Security, consistent with embodiments disclosed herein. Security through AAC logical circuit 521, along with an install via app store 521 initially secure iOS Security 520. iOS Security 500 communicates with the unity application 502. The device verification logical circuit 503 verifies that the device is compliant with the secure distribution and administration of digital examinations system rules and allows invocation of the unity application 502. The unity application 502 may communicate with the login/authentication logical circuit, which authenticates individual users in the secure distribution and administration of digital examinations system. In some embodiments, the login/authentication logical circuit 504 may invoke the display test menu 505. In some embodiments the just-in-time check 506 secures and invokes the display test menu 505, by verifying that the device is still compliant with the rules of the secure distribution and administration of digital examinations system. In some embodiments, the display test menu 505 communicates with the delivery engine logical circuit 507, which may use the delivery engine security logical circuit 508, to verify that delivery of information happens in a manner that is compliant with the rules of the secure distribution and administration of digital examinations system.

Figure 5D:
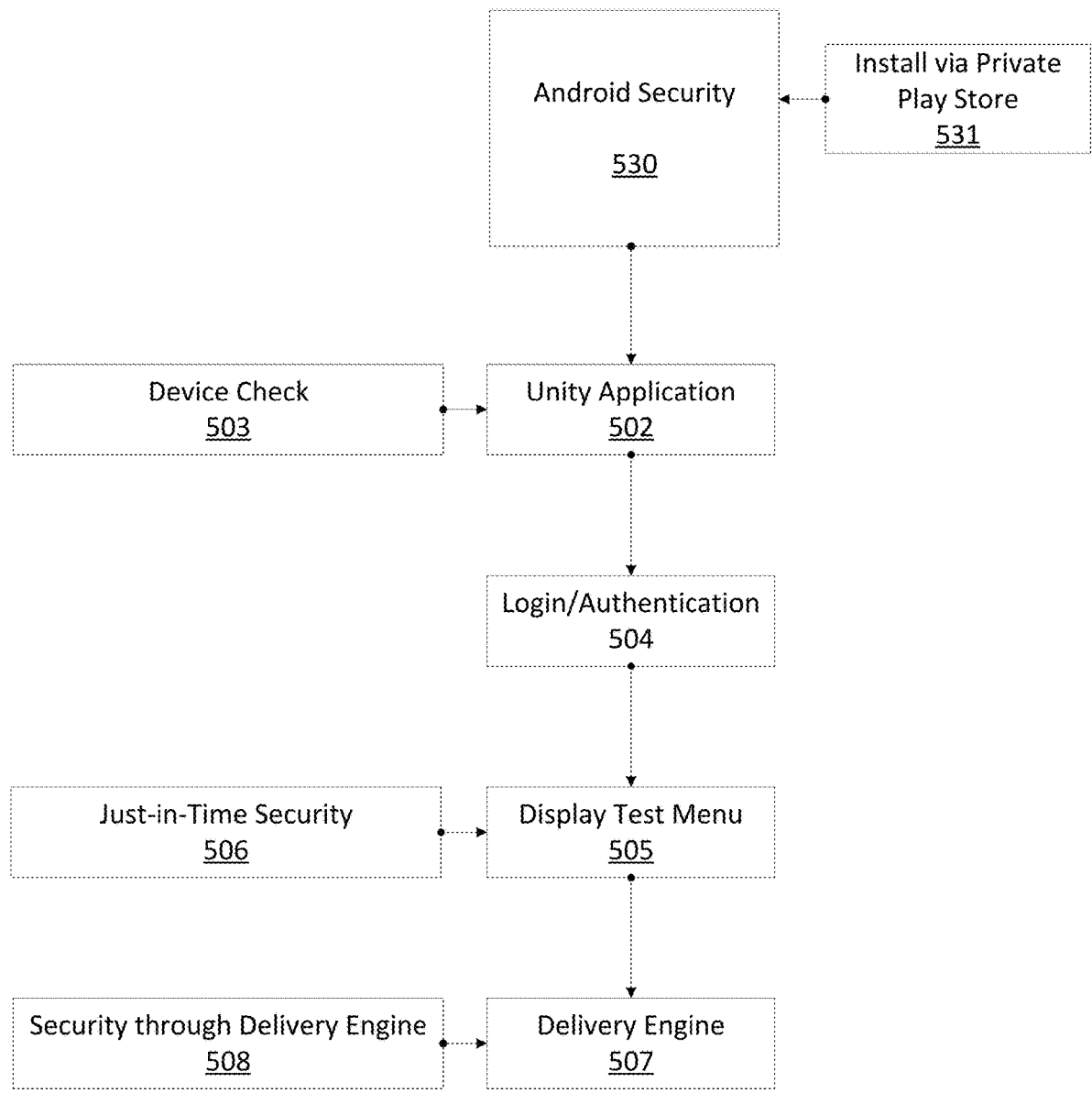
FIG. 5D is a components diagram illustrating an example configuration of the secure distribution and administration of digital examinations system interacting with Android security, consistent with embodiments disclosed herein.

FIG. 5D is a components diagram illustrating an example configuration of the secure distribution and administration of digital examinations system interacting with Android security, consistent with embodiments disclosed herein. Install via Private Play Store logical circuit 531 initially secure Android security 530. Android security 530 communicates with the unity application 502. The device verification logical circuit 503 verifies that the device is compliant with the secure distribution and administration of digital examinations system rules and allows invocation of the unity application 502. The unity application 502 may communicate with the login/authentication logical circuit, which authenticates individual users in the secure distribution and administration of digital examinations system. In some embodiments, the login/authentication logical circuit 504 may invoke the display test menu 505. In some embodiments the just-in-time check 506 secures and invokes the display test menu 505, by verifying that the device is still compliant with the rules of the secure distribution and administration of digital examinations system. In some embodiments, the display test menu 505 communicates with the delivery engine logical circuit 507, which may use the delivery engine security logical circuit 508, to verify that delivery of information happens in a manner that is compliant with the rules of the secure distribution and administration of digital examinations system.

Figure 5E:
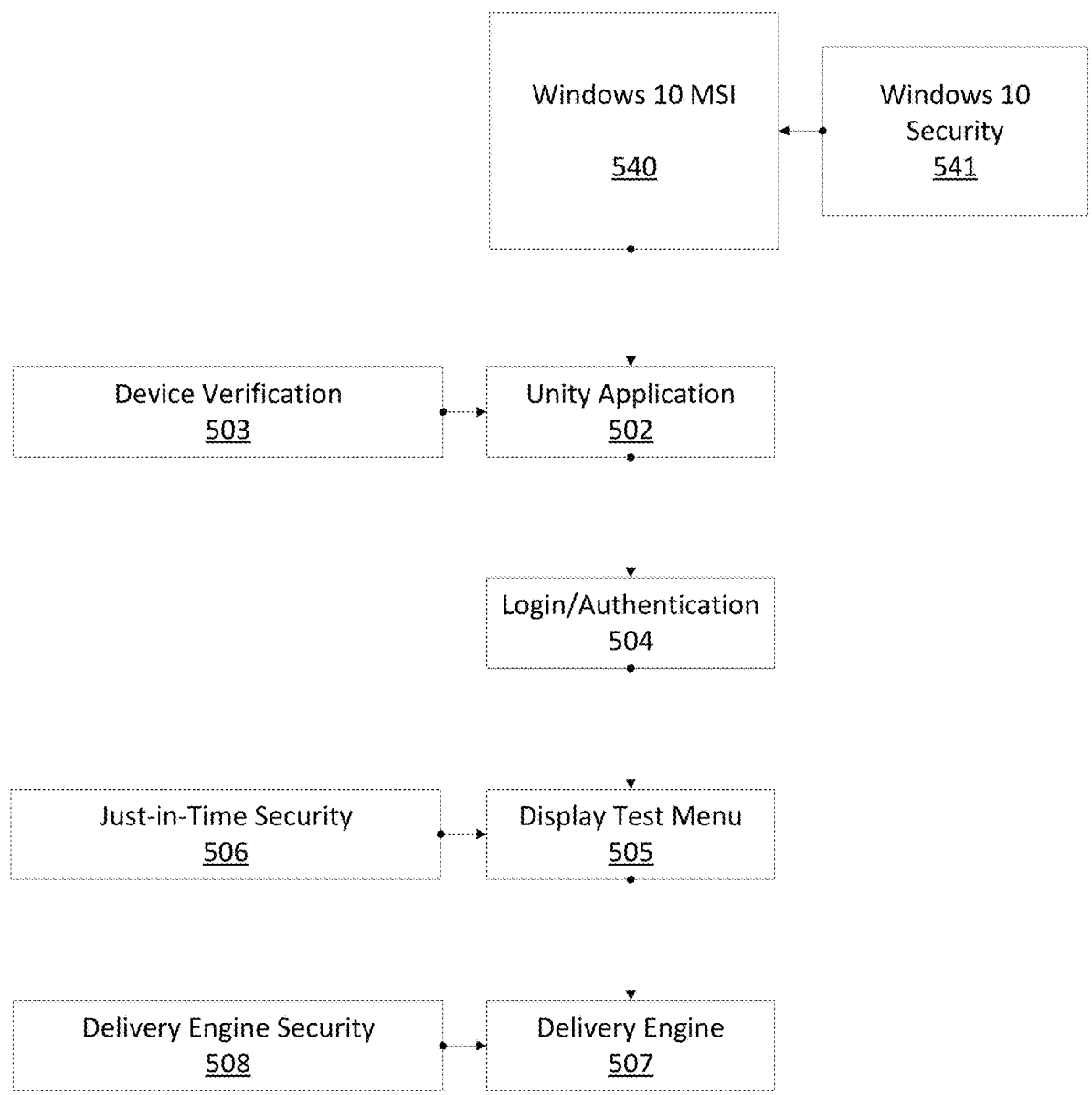
FIG. 5E is a components diagram illustrating an example configuration of the secure distribution and administration of digital examinations system interacting with Windows 10 MSI, consistent with embodiments disclosed herein.

FIG. 5E is a components diagram illustrating an example configuration of the secure distribution and administration of digital examinations system interacting with Windows 10 MSI, consistent with embodiments disclosed herein. In some embodiments, Windows 10 security logical circuit 541, may initially verify Windows 10 MSI 540. Windows 10 MSI 540 may communicate with the unity application 502. The device verification logical circuit 503 may verify that the device is compliant with the secure distribution and administration of digital examinations system rules. Successful verification of the device verification logical circuit 503 may allow invocation of the unity application 502. The unity application 502 may communicate with the login/authentication logical circuit 504, which authenticates individual users in the secure distribution and administration of digital examinations system. In some embodiments, the login/authentication logical circuit 504 may invoke the display test menu 505. In some embodiments the just-in-time check 506 secures and invokes the display test menu 505, by verifying that the device is still compliant with the rules of the secure distribution and administration of digital examinations system. In some embodiments, the display test menu 505 communicates with the delivery engine logical circuit 507, which may use the delivery engine security logical circuit 508, to verify that delivery of information happens in a manner that is compliant with the rules of the secure distribution and administration of digital examinations system.

Figure 6:
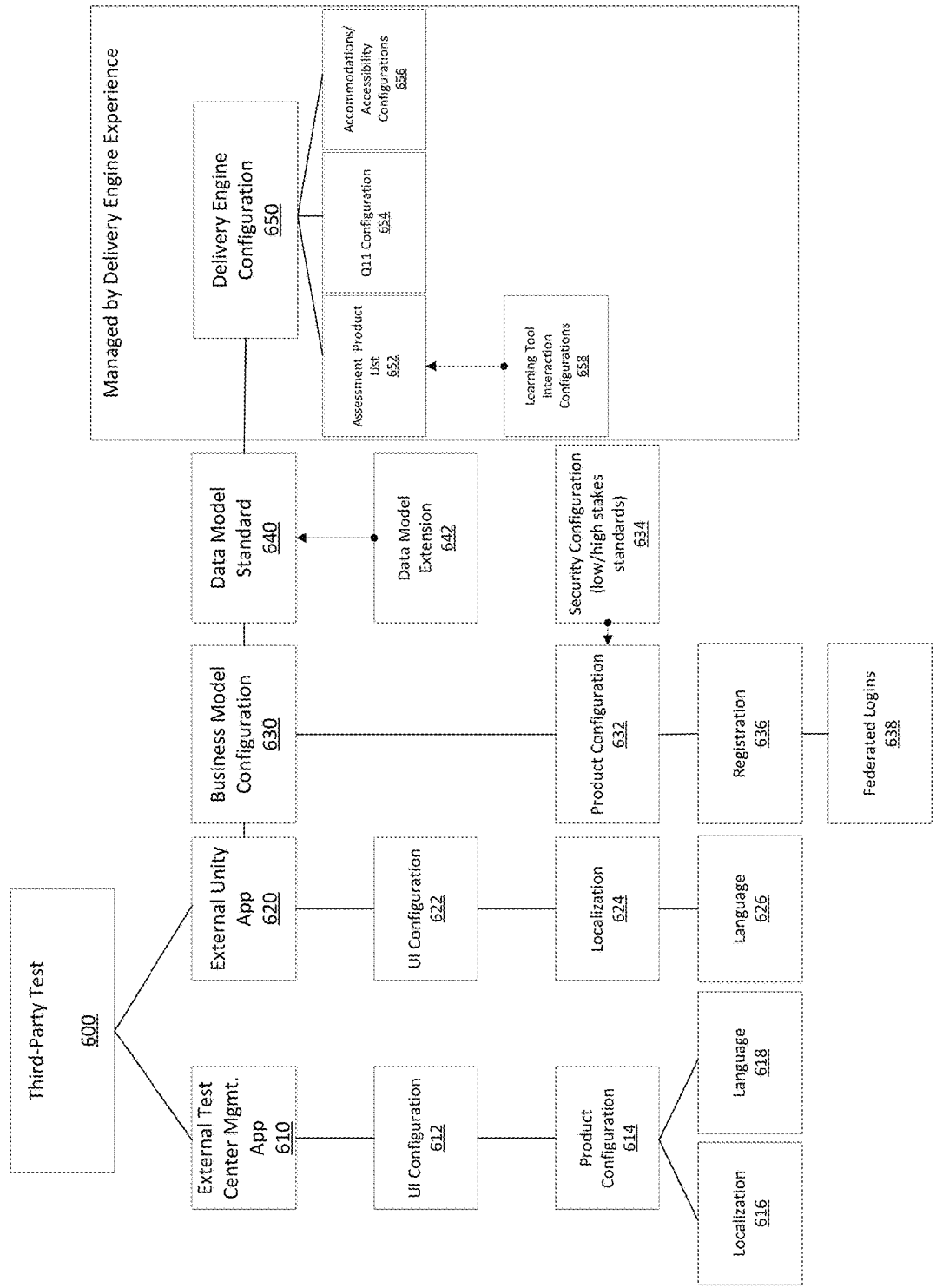
FIG. 6 is a components diagram illustrating an example configuration of an external test interacting within the context of an example system for secure distribution and administration of digital examinations, consistent with embodiments disclosed herein.

FIG. 6 is a components diagram illustrating an example configuration of an external test logical circuit 600 interacting within the context of the secure distribution and administration of digital examinations system, consistent with embodiments disclosed herein. For example, an external test may be a test from a third-party organization. The testing interface may be designed to conform with the third-party's branding. In some embodiments, external test 600 may communicate with the external test center management app 610. External test center management app 610 may include user interface configuration logical circuit 612. The user interface configuration logical circuit may have an associated product configuration logical circuit. The product configuration logical circuit 616 may include a localization logical circuit 616 and a language logical circuit 618.

In some embodiments, the external test logical circuit 600 may communicate with the external unity app 620 to administer secure examination. External unity app 620 may integrate with a user interface configuration logical circuit 622. The user interface configuration logical circuit 622 may include a localization logical circuit 616 and a language logical circuit 618.

In some embodiments, the external unity app 620 may be connected to the business model configuration logical circuit 630. The business model configuration 630 may have a product configuration logical circuit 632. The product configuration logical circuit 632 may be associated with a security configuration logical circuit 634.

In some embodiments, the business model configuration logical circuit 630 may be connected to the data model standard database 640. In some embodiments, the data model standard database 640 may utilize a data model extension 642 to expand the data model standard database to allow for different data-types associated with the external test 600.

In some embodiments, the data model standard 640 may be connected to the delivery engine configuration 650. In some embodiments, the delivery engine configuration logical circuit 650 may communicate with an assessment product list database. The assessment product list database may be accessed by learning tool integration configurations logical circuit 658 to determine what tests are associated with what test assessment frameworks, and how feedback is delivered to the examinee interfaces. In some embodiments, the delivery engine configuration logical circuit 650 may communicate with Q11 configurations logical circuit 654 to determine the best communication protocol to deliver information to the examinee interfaces. In some embodiments, the delivery engine configuration logical circuit 650 may communicate with the accommodations/accessibility configurations logical circuit 656. The accommodations/accessibility configurations logical circuit 656 may be configured to contribute to determining special delivery methods based on the different characteristics of the test or examinee interface.

Figure 7:
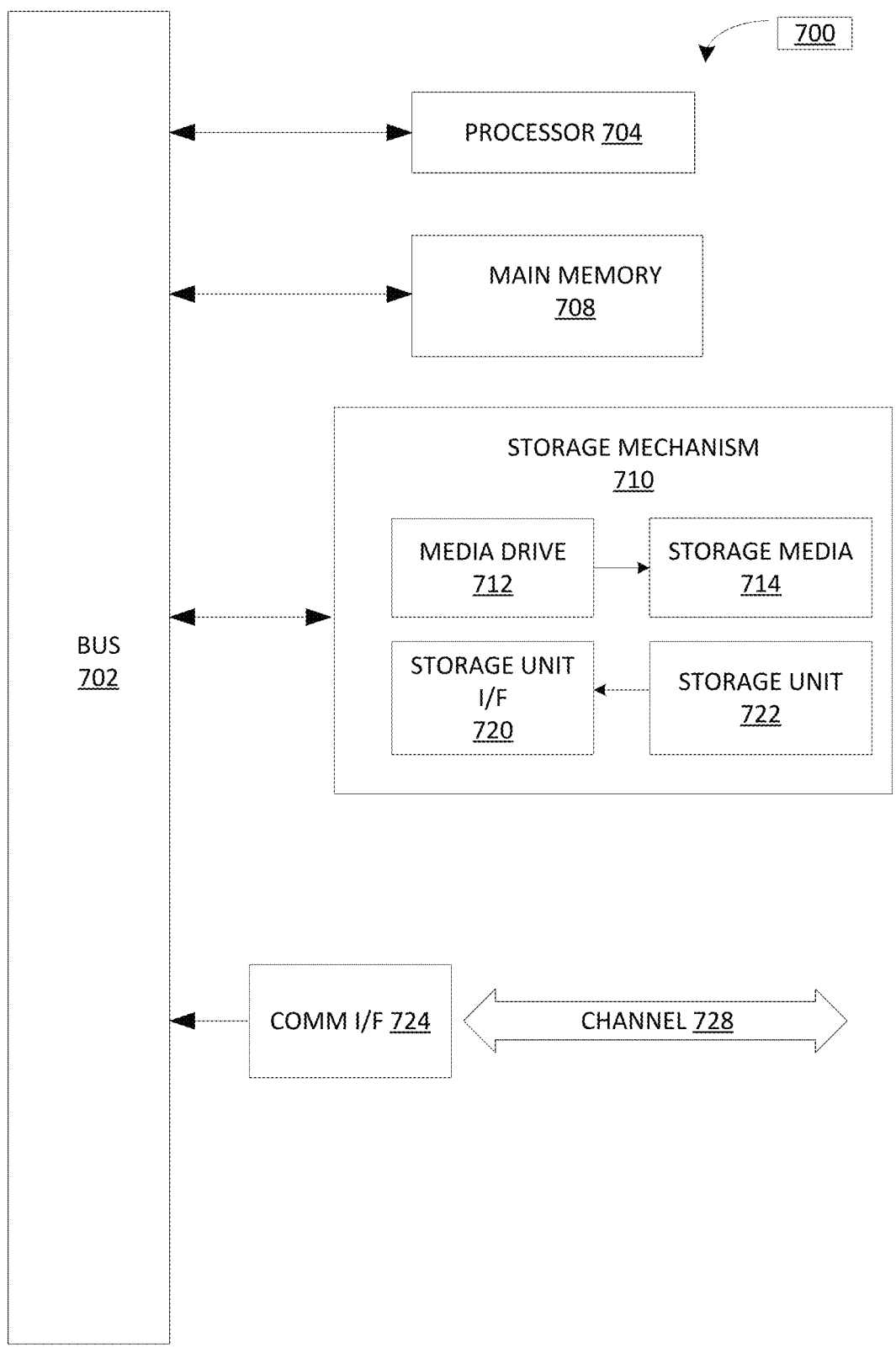
FIG. 7 illustrates a diagram of a computer system, consistent with embodiments disclosed herein.

As used herein, the term engine might describe a given unit of functionality that can be performed in accordance with one or more embodiments of the technology disclosed herein. As used herein, an engine might be implemented utilizing any form of hardware, software, or a combination thereof. For example, one or more processors, controllers, ASICs, PLAs, PALs, CPLDs, FPGAs, logical components, software routines or other mechanisms might be implemented to make up an engine. In implementation, the various engines described herein might be implemented as discrete engines or the functions and features described can be shared in part or in total among one or more engines. In other words, as would be apparent to one of ordinary skill in the art after reading this description, the various features and functionality described herein may be implemented in any given application and can be implemented in one or more separate or shared engines in various combinations and permutations. Even though various features or elements of functionality may be individually described or claimed as separate engines, one of ordinary skill in the art will understand that these features and functionality can be shared among one or more common software and hardware elements, and such description shall not require or imply that separate hardware or software components are used to implement such features or functionality.

Where logical circuits or engines of the technology are implemented in whole or in part using software, in one embodiment, these software elements can be implemented to operate with a computing or processing engine capable of carrying out the functionality described with respect thereto. One such example computing engine is shown in FIG. 7. Various embodiments are described in terms of this example computing engine 700. After reading this description, it will become apparent to a person skilled in the relevant art how to implement the technology using other computing engines or architectures.

Referring now to FIG. 7, computing system 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing engine 700 might also represent computing capabilities embedded within or otherwise available to a given device. For example, a computing engine might be found in other electronic devices such as, for example, digital cameras, navigation systems, cellular telephones, portable computing devices, modems, routers, WAPs, terminals and other electronic devices that might include some form of processing capability.

Computing system 700 might include, for example, one or more processors, controllers, control engines, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other logical circuits of computing engine 700 or to communicate externally.

Computing system 700 might also include one or more memory engines, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing engine 700 might likewise include a read only memory ("ROM") or other static storage device coupled to bus 702 for storing static information and instructions for processor 704.

The computing system 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing engine 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory engine) and memory slot, a PCMCIA slot and card, and other fixed or removable storage units 722 and interfaces 720 that allow software and data to be transferred from the storage unit 722 to computing engine 700.

Computing engine 700 might also include a communications interface 724. Communications interface 724 might be used to allow software and data to be transferred between computing engine 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing engine 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the logical circuits or functionality described or claimed as part of the engine are all configured in a common package. Indeed, any or all of the various logical circuits of an engine, whether control logic or other logical circuits, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

We claim:

1. A system for administering a secure examination comprising:
   a plurality of examinee interfaces;
   a gateway; and
   a local examination server, the local examination server comprising a network adapter, a security system, a processor, and a non-transitory memory with computer executable instructions embedded thereon;
   wherein the network adapter provides a first network connection to a central examination server through the gateway and a second network connection to the plurality of examinee interfaces;
   wherein the computer executable instructions cause the processor to:
      obtain a plurality of examination items from the central examination server;
      transmit the plurality of examination items to the plurality of examinee interfaces; and
      obtain, from the plurality of examinee interfaces, answers corresponding to the plurality of examination items;
      transmit, to the central examination server, the answers after all examinations have been completed; and
   wherein the security system is configured to:
      perform a first scan of the plurality of examinee interfaces before first use to record properties of each of the plurality of examinee interfaces and verify that the examinee interface conform to a predetermined configuration;
      perform a second scan of the plurality of examinee interfaces and the first and second network connections to verify the first and second network connections and the plurality of examinee interfaces conform to the predetermined configuration;
      enter an examination mode, wherein the obtained examination item is displayed to the plurality of examinee interfaces within a secure examination window;
      disable access to restricted applications and system functions;
      monitor the first and second network connections and the plurality of examinee interfaces while the examinee interfaces are in the examination mode to verify conformance with the predetermined configuration; and
      cause the examinee interfaces to exit the examination mode after completion of the examination.

2. The system of claim 1, wherein the first network connection is a WAN network connection.

3. The system of claim 1, wherein the second network connection is a wireless network connection.

4. The system of claim 1, wherein the first network connection and the second network connection operate concurrently.

5. The system of claim 1, wherein the second network connection persists when the first network connection is disconnected.

6. The system of claim 1 further comprising an examination kit comprising an enclosure shaped to enclose the plurality of examinee interfaces and the local examination server.

7. The system of claim 1, wherein the plurality of examinee interfaces comprise laptops, tablet computers, or desktop computers.

8. The system of claim 1, wherein the predetermined configuration for the examinee interfaces comprises an approved operating system type, operating system version, set of registry settings, set of peripheral device connections, or battery life availability.

9. The system of claim 1, wherein the security system causes the operating system of each examinee interfaces to implement examination security measures.

10. The system of claim 9, wherein the examination security measures comprise a kiosk mode.

11. A kit for administering a secure examination comprising:
   a plurality of examinee interfaces and a kit enclosure, the kit enclosure comprising:
      a gateway;
      power adapters configured to power the plurality of examinee interfaces when disposed within the kit enclosure; and
      a local examination server comprising;
         a first network adapter configured to communicatively couple to a central examination server via a first network connection through the gateway;
         a second network adapter configured to communicatively couple to the plurality of examinee interface via a second network connection;
         a processor and a non-transitory medium with computer executable instructions embedded thereon, the computer executable instructions to cause the processor to:
            obtain examination items from the central examination server;
            transmit the examination items to the plurality of examinee interfaces;
            obtain a responsive input to the examination items from the plurality of examinee interfaces; and
            transmit the responsive input to the central examination server; and
         a security logical circuit for providing examination security measures, wherein the security logical circuit is configured to:
            cause the examinee interfaces to enter an examination mode such that the examination items are displayed within a secure examination window on each examinee interface;
            restrict access to applications, networks, and devices not required for taking the examination; and
            monitor the first and second network connections and plurality of examinee interfaces throughout examination to verify that they conform to a predetermined configuration.

12. The kit of claim 11, wherein the first network connection is a WAN network connection.

13. The kit of claim 11, wherein the second network connection is a wireless network connection.

14. The kit of claim 11, wherein the second network connection persists when the first network connection is disconnected.

15. The kit of claim 11, wherein the plurality of examinee interfaces comprise tablet computers that initialize when removed from the kit enclosure.

16. The kit of claim 11, wherein the predetermined configuration for the examinee interfaces comprises an approved operating system type, operating system version, set of registry settings, set of peripheral device connections, or battery life availability.

17. A computer-implemented method for administering a secure examination comprising a plurality of examinee interfaces, a local examination server, a gateway, and a security system, the method further comprising:

establishing a first network connection between the local examination server and a central examination server via the gateway;

establishing a second network connection between the local examination server and the plurality of examinee interfaces;

obtaining examination items from the central examination server;

transmitting the examination items to the plurality of examinee interfaces;

obtaining responses to the examination items from the examinee interfaces;

transmitting the responses to the central examination server;

performing a first scan of the plurality of examinee interfaces prior to transmitting the examination items to the examinee interfaces to verify that the examinee interfaces conform with a predetermined configuration;

implementing an examination mode on the examinee interfaces, wherein the examination mode restricts access by the examinee interfaces to restricted applications and external devices;

monitoring the examinee interfaces and the first and second network connections while the examinee interfaces are in the examination mode to verify conformance with the predetermined configuration; and returning the examinee interfaces to normal operating conditions when examination is complete.

18. The method of claim 17, wherein the first network connection is a WAN network connection.

19. The method of claim 17, wherein the second network connection is a wireless network connection.

20. The method of claim 17, wherein the second network connection remains operable and the local examination server continues to transmit the examination items to and obtain responses from the examinee interfaces when the first network connection is disconnected.

* * * * *